US009537780B2

(12) United States Patent
Bloom et al.

(10) Patent No.: US 9,537,780 B2
(45) Date of Patent: Jan. 3, 2017

(54) QUALITY OF SERVICE AGREEMENT AND SERVICE LEVEL AGREEMENT ENFORCEMENT IN A CLOUD COMPUTING ENVIRONMENT

(71) Applicant: Verizon Patent and Licensing Inc., Basking Ridge, NJ (US)

(72) Inventors: Jeff Bloom, Bellingham, MA (US); Paul M. Curtis, Sudbury, MA (US); Alex Iannicelli, Andover, MA (US); Kishore Chitrapu, Shrewsbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 175 days.

(21) Appl. No.: 14/010,224

(22) Filed: Aug. 26, 2013

(65) Prior Publication Data
US 2015/0058474 A1 Feb. 26, 2015

(51) Int. Cl.
*G06F 15/173* (2006.01)
*H04L 12/851* (2013.01)
*H04L 12/24* (2006.01)
*H04L 29/08* (2006.01)

(52) U.S. Cl.
CPC ....... *H04L 47/2425* (2013.01); *H04L 12/2417* (2013.01); *H04L 12/2418* (2013.01); *H04L 29/08153* (2013.01)

(58) Field of Classification Search
CPC ....... H04L 12/2417; H04L 43/08; H04L 43/16
See application file for complete search history.

(56) References Cited

U.S. PATENT DOCUMENTS

| | | | |
|---|---|---|---|
| 7,346,000 B1 * | 3/2008 | Srinivasan et al. | 370/235 |
| 7,606,895 B1 * | 10/2009 | Dini et al. | 709/224 |
| 8,213,323 B1 * | 7/2012 | Papagiannaki | 370/252 |
| 2003/0086422 A1 * | 5/2003 | Klinker et al. | 370/389 |
| 2003/0229714 A1 * | 12/2003 | Kiremidjian et al. | 709/244 |
| 2004/0243699 A1 * | 12/2004 | Koclanes et al. | 709/224 |
| 2010/0223217 A1 * | 9/2010 | Little | G06F 9/5088 709/224 |
| 2012/0054626 A1 * | 3/2012 | Odenheimer | 715/738 |
| 2013/0132561 A1 * | 5/2013 | Pasala | H04L 67/1097 709/224 |

* cited by examiner

*Primary Examiner* — Chirag R Patel
*Assistant Examiner* — Jean P Mendez Flores

(57) ABSTRACT

A device may receive traffic to be processed by one or more cloud computing resources associated with a cloud computing service provided via a cloud computing environment. The device may determine enforcement policy information associated with the traffic. The device may determine an aggregated performance metric associated with the traffic. The aggregated performance metric may be based on information associated with the one or more computing resources that are assigned to process the traffic. The device may determine a maximum performance metric associated with the traffic, and the maximum performance metric may be identified in the enforcement policy information. The device may compare the aggregated performance metric and the maximum performance metric, and may manage the traffic based on comparing the aggregated performance metric and the maximum performance metric.

20 Claims, 15 Drawing Sheets

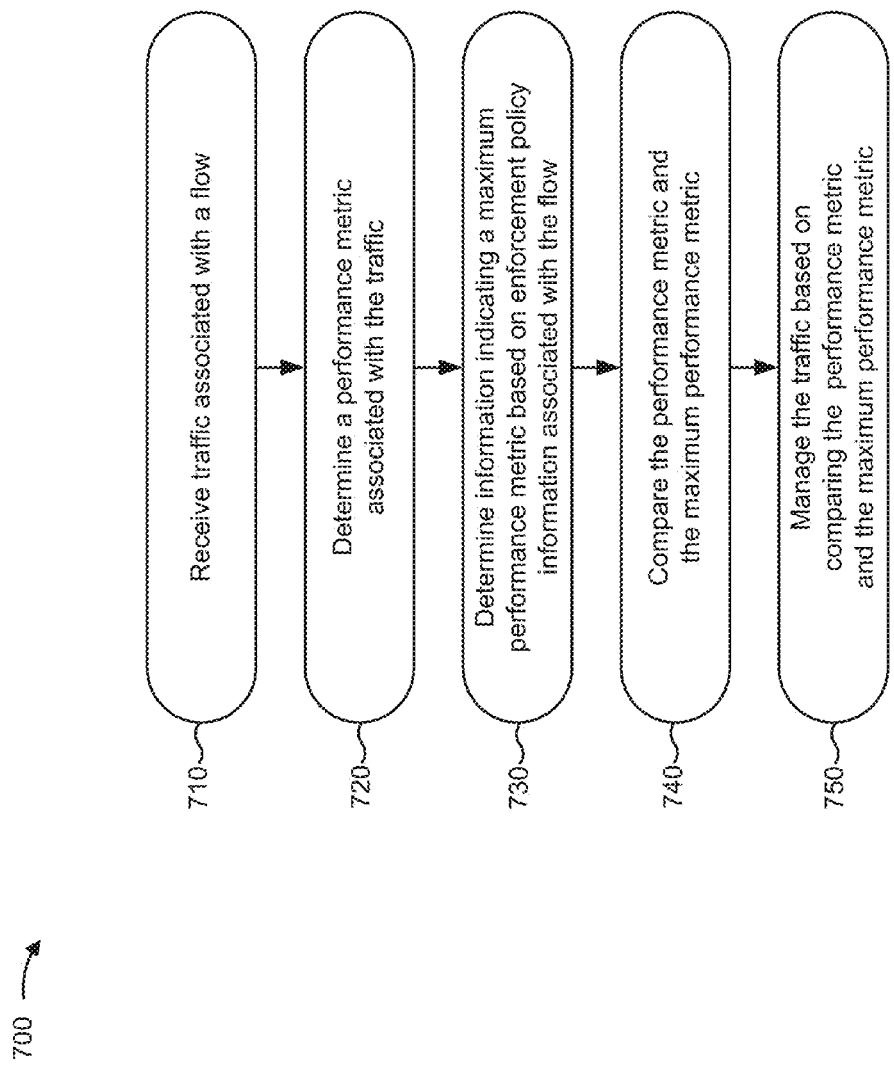

QUALITY OF SERVICE AGREEMENT AND SERVICE LEVEL AGREEMENT ENFORCEMENT IN A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Customers may buy these computing resources and use the computing resources on an on-demand basis. Cloud computing environments provide services that do not require end-user knowledge of a physical location and configuration of a system that delivers the services.

BRIEF DESCRIPTION OF THE DRAWINGS

FIG. 7 is a flow chart of an example process for identifying and managing traffic, associated with a customer of a cloud computing service, based on enforcement policy information;

DETAILED DESCRIPTION

The following detailed description of example implementations refers to the accompanying drawings. The same reference numbers in different drawings may identify the same or similar elements.

A service provider may provide a cloud computing service to a customer. The service provider may wish to guarantee a performance metric (e.g., a bandwidth rate, a rate of input/output operations, a storage-specific metric, etc.) that will be available to traffic, associated with the customer, when using cloud computing resources associated with the cloud computing service. The service provider may also want to prevent traffic, associated with the customer, from using a quantity of cloud computing resources that may cause a disruption (e.g., due to an inadequate quantity of available computing resources, etc.) to traffic associated with another customer. The service provider may enter into an agreement with the customer (e.g., a quality of service agreement/service level agreement ("QoS/SLA"), etc.) that may include a guaranteed performance metric that is to be available to traffic associated with the customer. The agreement may also include a performance metric that may not be exceeded by the traffic associated with the customer.

A management device, associated with the service provider and/or the cloud computing service, may enforce the agreement by determining the performance metric associated with the traffic, and by managing the traffic (e.g., by limiting the amount of cloud computing resources used to handle the traffic, etc.) so the performance metric of the traffic does not exceed the performance metric identified in the agreement. Implementations described herein may allow a cloud computing service provider to guarantee and/or enforce a performance metric for traffic associated with a customer by not permitting a computing resource to be overburdened. In this way, the service provider may guarantee a performance metric to traffic associated with a customer of a cloud computing service, from end-to-end (e.g., from the user facing end of the cloud computing service to the physical devices associated with the cloud computing service). Implementations described herein may further provide end-to-end quality of service (e.g., based on a service level agreement) for storage resources, network resources, computing resources, memory resources, or the like.

Figure 1A:
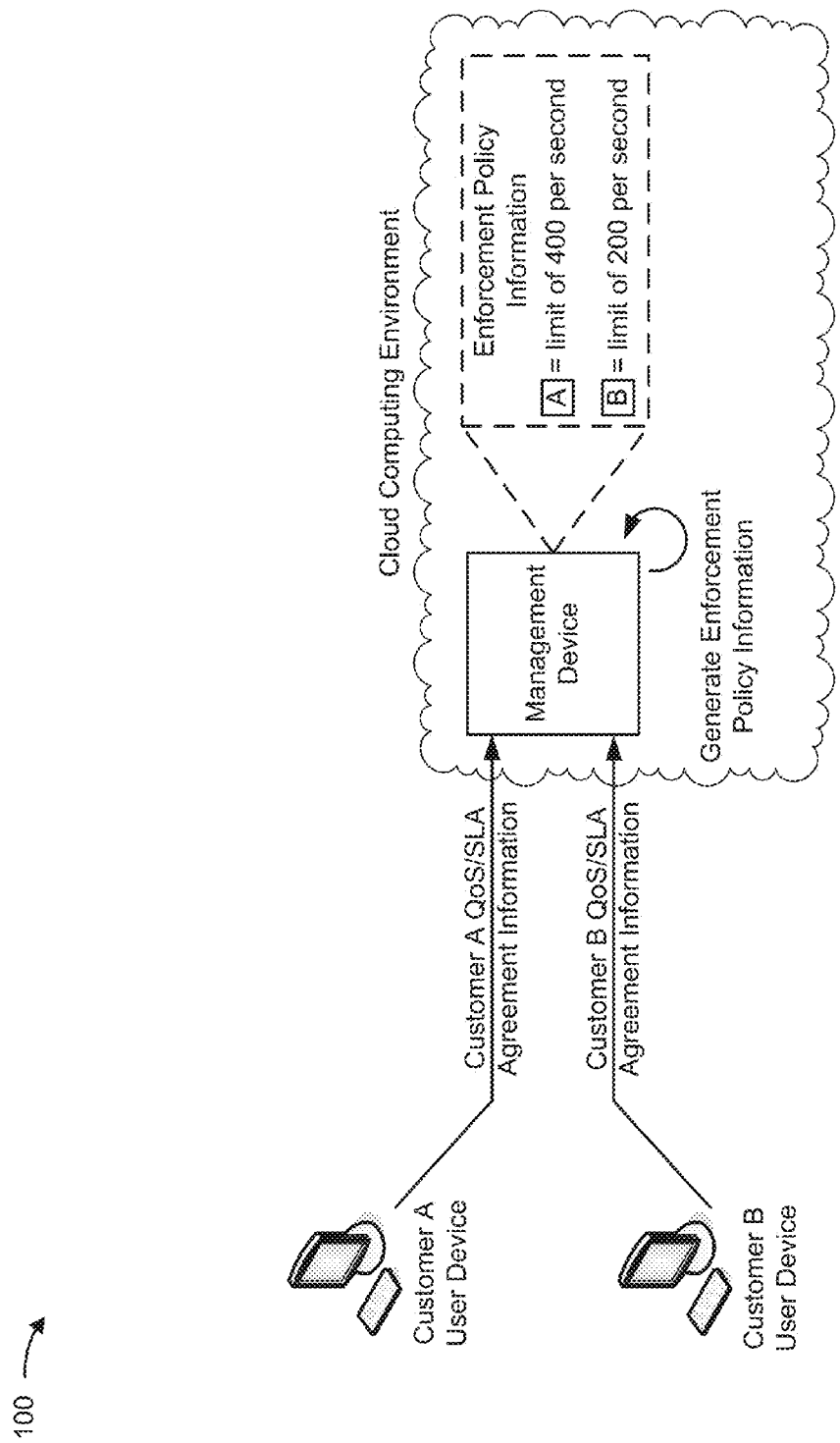
FIGS. 1A-1C are a diagrams of an overview of an example implementation described herein.
Figure 1B:
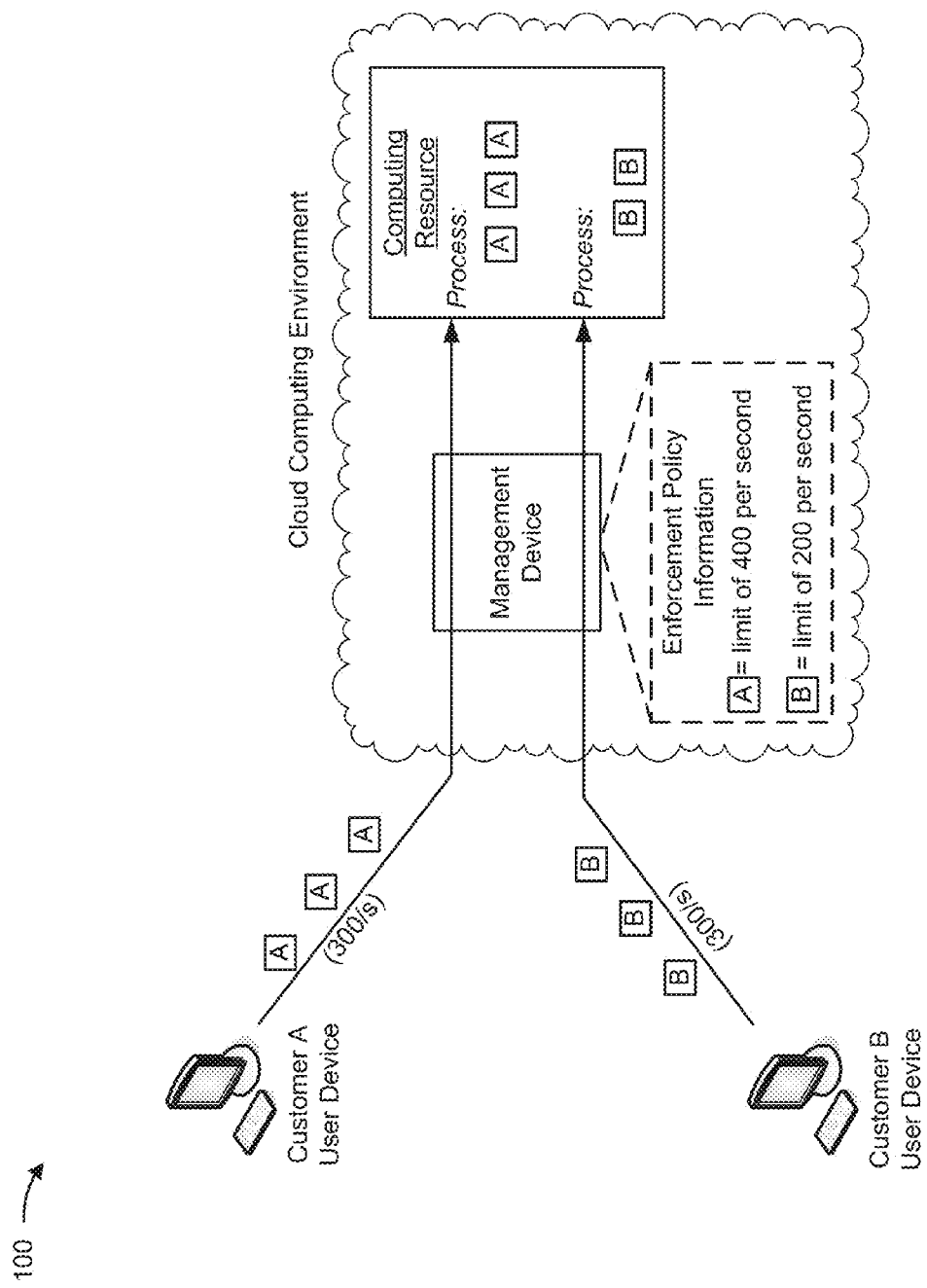
Figure 1C:
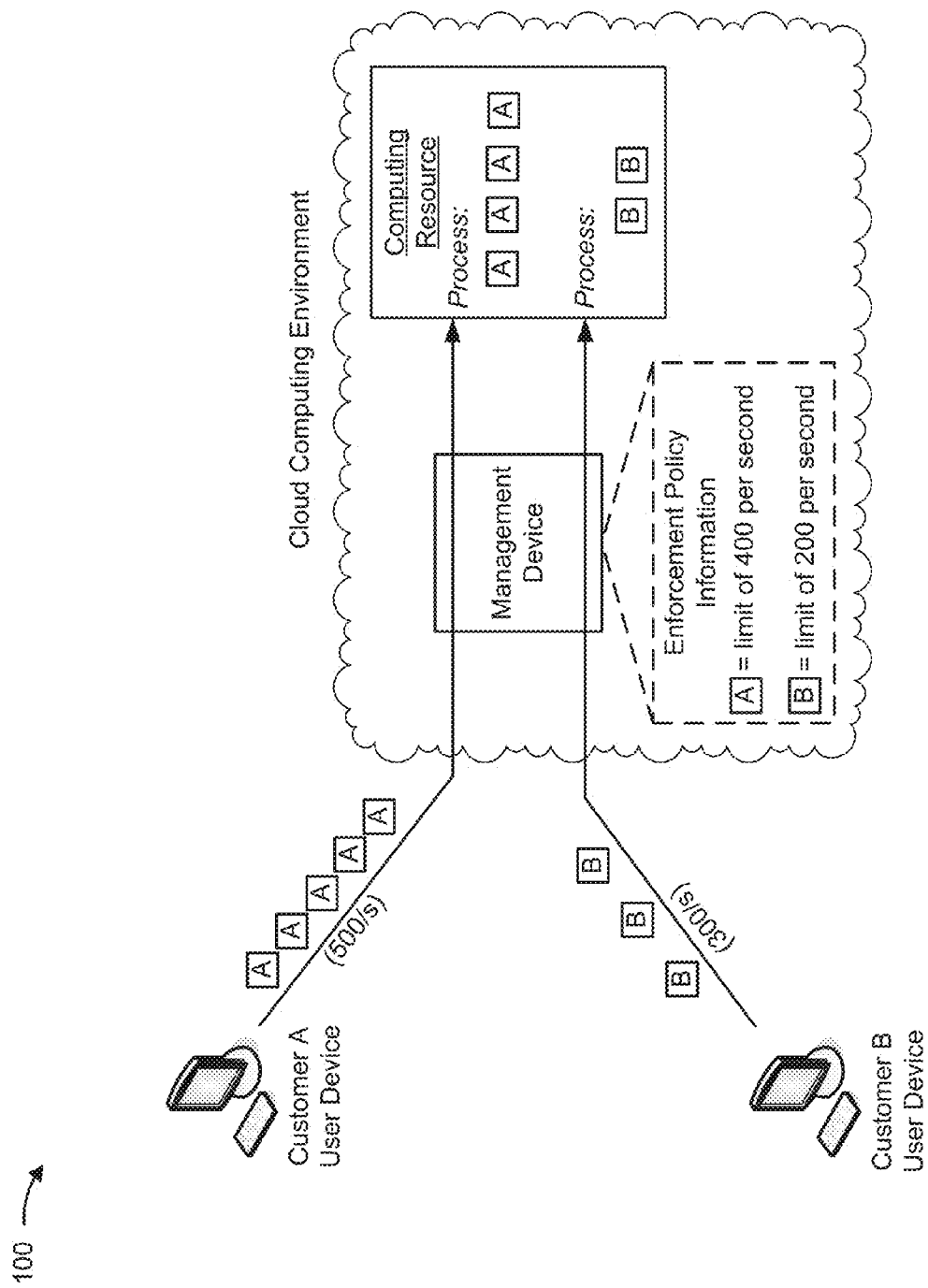

FIGS. 1A-1C are diagrams of an overview of an example implementation 100 described herein. As shown in FIG. 1A, assume that a service provider provides cloud computing services for two customers, identified as customer A and customer B. Further, assume that the service provider has an agreement in place with each customer, and that each agreement includes a maximum performance metric at which traffic may be processed by a computing resource associated with the cloud computing service.

As shown in FIG. 1A, a user device associated with customer A may provide information associated with an agreement (e.g., a QoS/SLA agreement, etc.), between customer A and the service provider, to a management device associated with the cloud computing service. As further shown, a user device associated with customer B may provide information associated with an agreement, between customer B and the service provider, to the management device. As shown, the management device may generate enforcement policy information for each customer (e.g., may determine a maximum performance metric at which traffic, associated with each customer, is to be processed) based on the agreement information associated with each customer. As shown, the management device may generate enforcement policy information that indicates that traffic associated with customer A (e.g., identified using a first flow identifier) is to be processed at a maximum performance metric of 400 units per second, and that traffic associated with customer B (e.g., identified using a second flow identifier) is to be processed at a maximum performance metric of 200 units per second. Finally, the management device may store the enforcement policy information, as shown.

As shown in FIG. 1B, the customer A user device may send traffic, to be processed by a computing resource included in the cloud computing environment (e.g., a computing resource assigned to process the customer A traffic and the customer B traffic), at a performance metric of 300 units per second. As also shown, the customer B user device may send traffic, to be processed by the computing resource, at a performance metric of 300 units per second.

As shown, the management device may identify the traffic associated with customer A (e.g., based on the first flow identifier), and may determine that the performance metric of the traffic associated with the customer A user device (e.g., 300 units per second) is below the maximum performance metric (e.g., 400 units per second), associated with customer A, identified in the enforcement policy information. The management device may forward the customer A traffic to be processed by the computing resource (e.g., at a rate of 300 units per second).

As further shown in FIG. 1B, the management device may identify the traffic associated with customer B (e.g., based on the second flow identifier), and may determine that the performance metric of the traffic associated with the customer B user device (e.g., 300 units per second) is above the maximum performance metric (e.g., 200 units per second) identified in the enforcement policy information. The management device may throttle and/or drop the traffic from the customer B user device, and may permit the traffic to be processed at the maximum performance metric, associated with customer B, identified in the enforcement policy information (e.g., 200 units per second).

As shown in FIG. 1C, assume that the performance metric of the traffic from the customer A user device increases to 500 units per second. As shown, the management device may determine that the performance metric of the customer A traffic (e.g., 500 units per second) is above the maximum allowable performance metric identified in the enforcement policy information associated with customer A (e.g., 400 units per second). As shown, the management device may throttle the traffic associated with the customer A user device, and may permit the traffic to be processed by the computing resource at the maximum performance metric identified in the enforcement policy information (e.g., 400 units per second). In this way, a cloud computing service provider may enforce a performance metric at which traffic, associated with a customer, is processed by a computing resource. In some implementations, this may prevent the computing resource, assigned to process the traffic, from being overburdened (e.g., by processing customer traffic at a performance metric within the limits of an enforcement policy).

Figure 2:
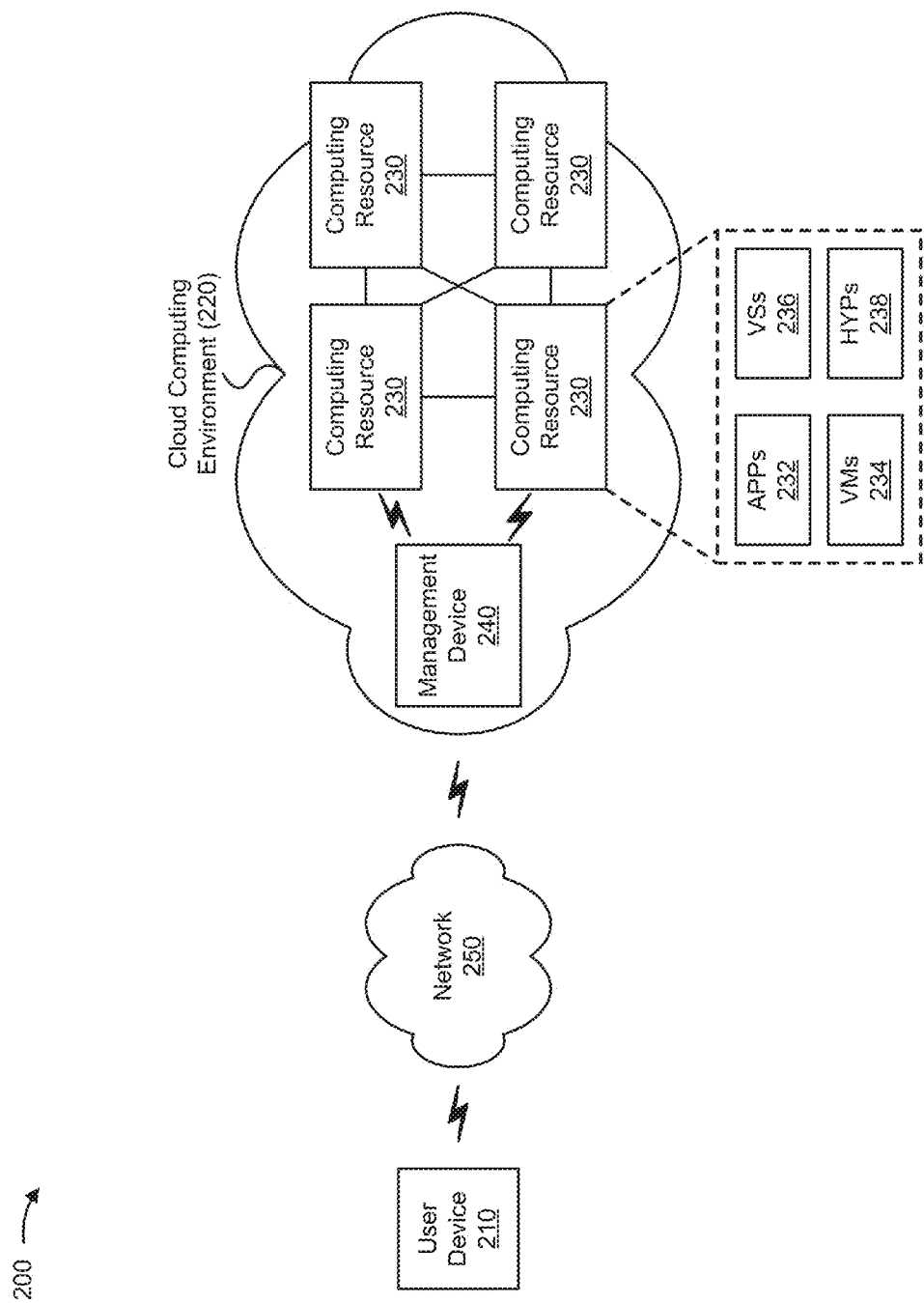
FIG. 2 is a diagram of an example environment in which systems and/or methods described herein may be implemented.

FIG. 2 is a diagram of an example environment 200 in which systems and/or methods described herein may be implemented. As shown, environment 200 may include a user device 210 interconnected with a cloud computing environment 220 via a network 250. Components of environment 200 may interconnect via wired connections, wireless connections, or a combination of wired and wireless connections.

User device 210 may include one or more devices that are capable of communicating with cloud computing environment 220 via network 250. For example, user device 210 may include a laptop computer, a personal computer, a tablet computer, a desktop computer, a workstation computer, a smart phone, a personal digital assistant ("PDA"), and/or other computation and communication devices. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as "computing resources 230" and individually as "computing resource 230") and a management device 240.

Computing resource 230 may include one or more personal computers, workstation computers, server devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections. In some implementations, one or more computing resources 230 may be assigned (e.g., by a device associated with the cloud computing service provider, etc.) to process traffic, associated with a customer, in accordance with a QoS/SLA agreement. In some implementations, computing resource 230 may be assigned to process traffic based on a capability of computing resource 230 (e.g., a total bandwidth rate that computing resource 230 may process, a total input/output operations rate that computing resource 230 may process, etc.). In some implementations, computing resource 230 may be assigned to process the traffic based on an availability of computing resource 230 (e.g., a quantity of processing power not yet assigned to process traffic, etc.). In some implementations, computing resource 230 may be assigned to process traffic of one or more customers of the cloud computing service.

As further shown in FIG. 2, computing resource 230 may include one or more applications ("APPs") 232, one or more virtual machines ("VMs") 234, virtualized storage ("VSs") 236, one or more hypervisors ("HYPs") 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system ("OS"). A process virtual machine may execute a single program, and may support a single process. In some implementations, virtual machine 234 may execute on behalf of a user (e.g., user device 210), and may manage infrastructure of cloud computing environment 220, such as data management, synchronization, or long-duration data transfers.

Virtualized storage 236 may include one or more storage systems and/or one or more devices that use virtualization techniques within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service provided by cloud computing environment 220.

Management device 240 may include a device capable of managing cloud computing environment 220 and/or one or more computing resources 230. For example, management device 240 may include a server, a gateway, a router, a modem, a switch, a firewall, a network interface card ("NIC"), a hub, a bridge, an optical add/drop multiplexer ("OADM"), or the like. In some implementations, management device 240 may include a device capable of receiving information (e.g., from user device 210) associated with an agreement (e.g., a QoS/SLA agreement, etc.), and generating enforcement policy information based on the agreement. Additionally, or alternatively, management device 240 may include a device capable of monitoring, throttling, and/or processing traffic associated with a customer of a cloud computing service based on the enforcement policy information. While shown as being located external to computing resource 230, management device 240 may be may be implemented within one or more computing resources 230 and/or one or more components of computing resource 230 (e.g., application 232, virtual machine 234, virtualized storage 236, hypervisor 238, etc.). Alternatively, management device 240 may be included within another device associated with cloud computing environment 220.

Network 250 may include a network, such as a local area network ("LAN"), a wide area network ("WAN"), a metropolitan area network ("MAN"), a telephone network, such as the Public Switched Telephone Network ("PSTN") or a cellular network, an intranet, the Internet, a fiber-optic based network, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Figure 3:
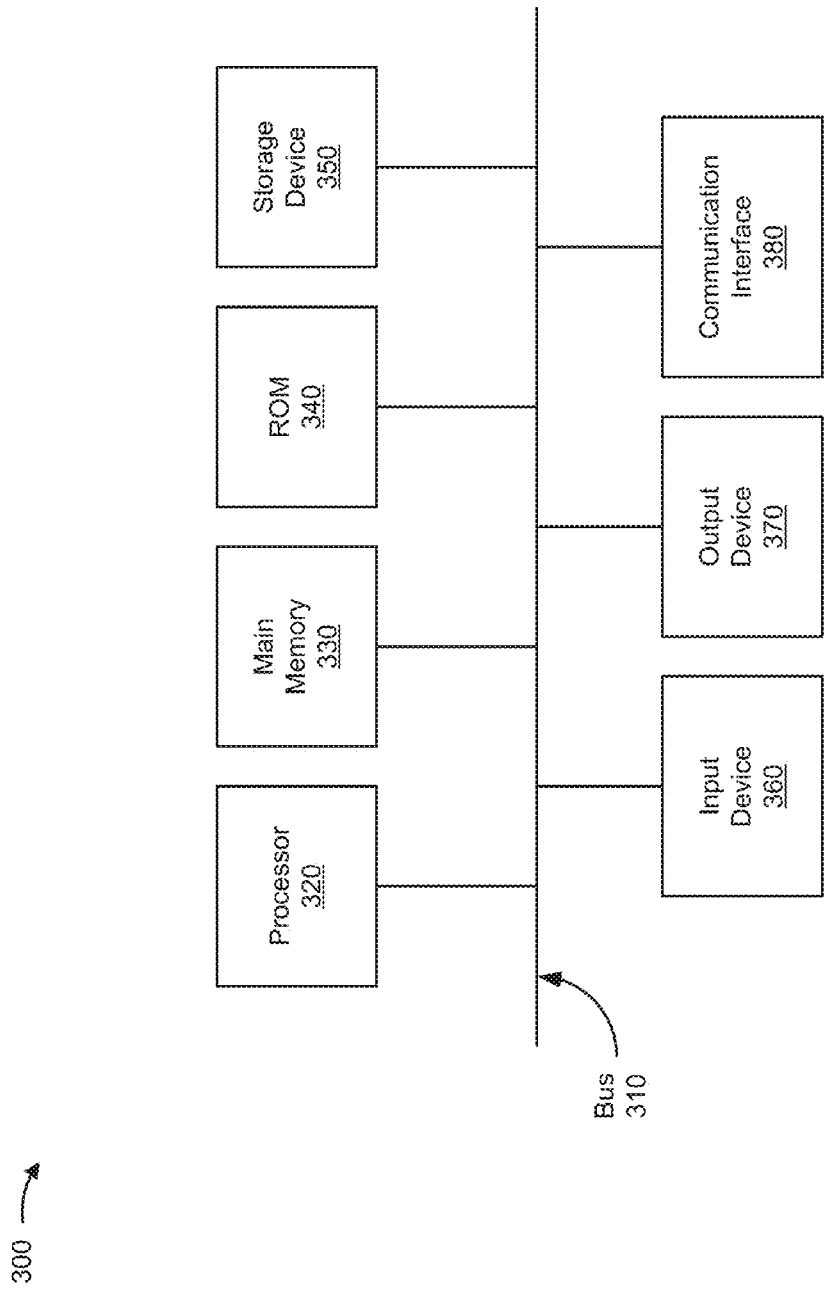
FIG. 3 is a diagram of example components of one or more devices of FIG. 2.

FIG. 3 is a diagram of example components of a device 300 that may correspond to one or more of the devices of environment 200. As shown, device 300 may include a bus 310, a processor 320, a main memory 330, a read-only memory ("ROM") 340, a storage device 350, an input device 360, an output device 370, and/or a communication interface 380. Bus 310 may include a path that permits communication among the components of device 300.

Processor 320 may include one or more processors, microprocessors, application-specific integrated circuits ("ASICs"), field-programmable gate arrays ("FPGAs"), or other types of processors that may interpret and execute instructions. Main memory 330 may include one or more random access memories ("RAMs") or other types of dynamic storage devices that may store information and/or instructions for execution by processor 320. ROM 340 may include one or more ROM devices or other types of static storage devices that may store static information and/or instructions for use by processor 320. Storage device 350 may include a magnetic and/or optical recording medium and a corresponding drive.

Input device 360 may include a component that permits a user to input information to device 300, such as a keyboard, a camera, an accelerometer, a gyroscope, a mouse, a pen, a microphone, voice recognition and/or biometric components, a remote control, a touch screen, a neural interface, etc. Output device 370 may include a component that outputs information from device 300, such as a display, a printer, a speaker, etc. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processor 320 executing software instructions contained in a computer-readable medium, such as main memory 330. A computer-readable medium may be defined as a non-transitory memory device. A memory device may include memory space within a single physical memory device or memory space spread across multiple physical memory devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
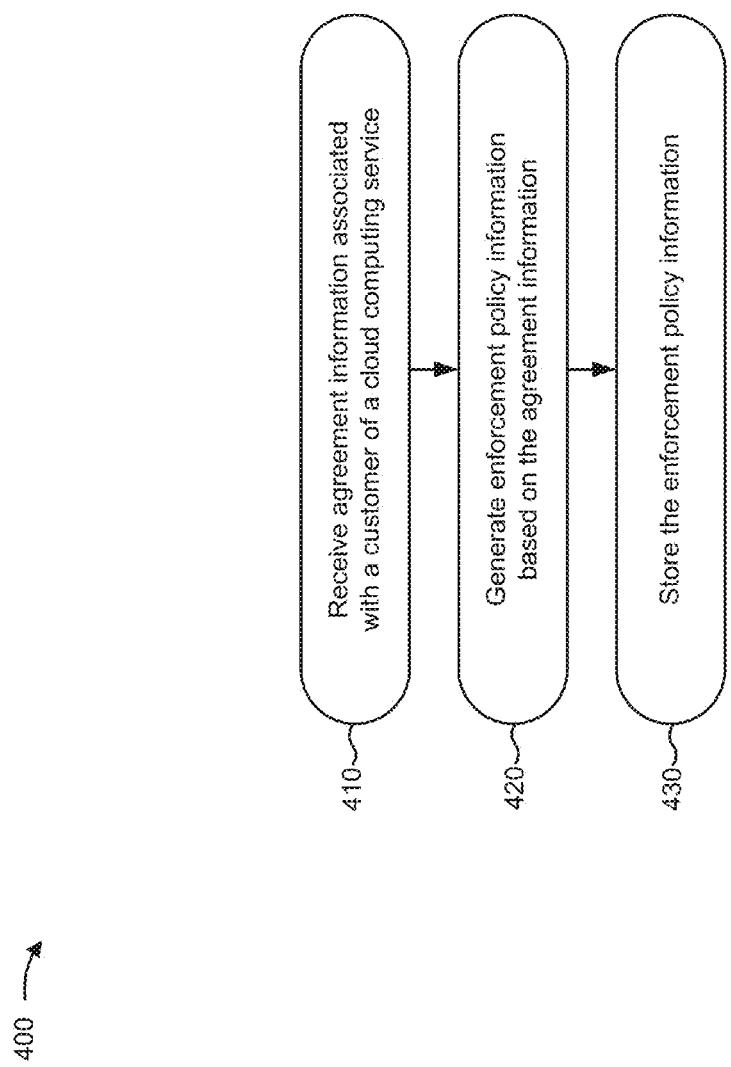
FIG. 4 is a flow chart of an example process for generating and storing enforcement policy information associated with a customer of a cloud computing service.

FIG. 4 is a flow chart of an example process 400 for generating and storing enforcement policy information associated with a customer of a cloud computing service. In some implementations, one or more process blocks of FIG. 4 may be performed by management device 240. In some implementations, one or more process blocks of FIG. 4 may be performed by another device or a group of devices separate from or including management device 240, such user device 210 and/or computing resource 230.

As shown in FIG. 4, process 400 may include receiving agreement information associated with a customer of a cloud computing service (block 410). For example, management device 240 may receive (e.g., from user device 210) agreement information (e.g., information associated with a QoS/SLA agreement, etc.) associated with a customer of the cloud computing service. Additionally, or alternatively, management device 240 may receive the agreement information from another device associated with the customer and/or cloud computing environment 220.

Agreement information, as used herein, may include information associated with an agreement between a cloud computing service provider and a customer of the cloud computing service provider. In some implementations, the agreement information may include a performance metric associated with a QoS/SLA agreement. A QoS/SLA agreement, as used herein, may refer to a quality of service agreement, a service level agreement, and/or a combined quality of service and service level agreement. The performance metric may be a measurement associated with processing and/or storage of traffic associated with the customer. For example, the performance metric may include a rate of processing (e.g., a bandwidth rate, or the like), a rate of storage (e.g., a rate of input/output operations, or the like), an error rate (e.g., an amount of latency, an amount of jitter, a packet dropping probability, a bit error rate), a measurement of time associated with processing (e.g., a maximum turn-around time, a maximum mean time to recover, etc.), or the like. In some implementations, the agreement information may include a required performance metric (e.g., a performance metric that is guaranteed to be available to traffic associated with the customer). Additionally, or alternatively, the agreement information may include a maximum performance metric (e.g., a performance metric that traffic, associated with the customer, may not exceed when being processed by computing resource 230).

As further shown in FIG. 4, process 400 may include generating enforcement policy information based on the agreement information (block 420). For example, management device 240 may generate enforcement policy information based on agreement information received from a device associated with a customer of the cloud computing service (e.g., user device 210).

In some implementations, management device 240 may generate the enforcement policy information when management device 240 receives (e.g., from user device 210) the agreement information. Additionally, or alternatively, management device 240 may generate the enforcement policy information when management device 240 identifies traffic associated with the customer. Additionally, or alternatively, management device 240 may generate the enforcement policy information based on receiving (e.g., from user device 210 and/or a device associated with cloud computing environment 220) updated agreement information.

Enforcement policy information, as used herein, may include information that may indicate a guaranteed performance metric (e.g., a minimum bit rate, a minimum input/output operations rate, a maximum amount of jitter, a maximum turn-around time, a maximum mean time to recover, etc.) for traffic associated with the customer that is to be processed by computing resource 230. Additionally, or alternatively, the enforcement policy information may include a maximum performance metric at which traffic, associated with the customer, is to be processed by computing resource 230. In some implementations, the enforcement policy information may be based on the agreement information received from user device 210. Additionally, or alternatively, the enforcement policy information may be based on a default performance metric (e.g., when agreement information, associated with the customer, is not available, etc.).

As further shown in FIG. 4, process 400 may include storing the enforcement policy information (block 430). For example, management device 240 may store the enforcement policy information in a data structure. In some implementations, management device 240 may store information associated with the enforcement policy information, such as a flow identifier (e.g., a string of characters, etc.) that identifies a flow (e.g., a traffic flow), a customer, and/or one or more computing resources 230 associated with the enforcement policy information (e.g., one or more computing resources 230, such as a volume, a hypervisor, a virtual machine, etc. assigned to a customer for handling customer traffic). In some implementations, management device 240 may store the enforcement policy information in a memory location (e.g., a RAM, a hard disk, etc.) associated with user device 210 and/or computing resource 230.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel. Further, one or more blocks of process 400 may be omitted in some implementations.

Figure 5:
FIG. 5 is a diagram of an example data structure that stores enforcement policy information associated with a customer.

FIG. 5 is a diagram of an example data structure 500 that stores enforcement policy information associated with a customer. Data structure 500 may be stored in a memory device (e.g., a RAM, a hard disk, etc.) associated with one or more devices and/or components of FIG. 2 and/or FIG. 3. For example, data structure 500 may be stored by management device 240, computing resource 230, and/or user device 210.

As shown in FIG. 5, data structure 500 may include a collection of fields, such as a flow identifier field 510, an input/output field 520, and a bandwidth field 530.

Flow identifier field 510 may store information that identifies a flow, a customer, and/or one or more computing resources 230 of a cloud computing service associated with enforcement policy information. For example, flow identifier field 510 may store information identifying a customer using a string of characters associated with a customer name (e.g., EdgeCom, etc.), information associated with an account of the customer (e.g., an account number, etc.), or the like. The information identifying the customer may include a unique identifier mapped to a customer and may be set up, for example, once a customer enters into a service level agreement with a cloud computing service provider. Additionally, or alternatively, the flow identifier may identify a flow (e.g., management device 240 may identify a traffic flow as being associated with a particular customer, a particular quality of service level, a particular computing resource 230, or the like).

Input/output field 520 may store information that identifies an input/output storage rate that may be identified by enforcement policy information associated with the flow identified in flow identifier field 510. For example, input/output field 520 may store information that identifies an input/output rate (e.g., 400 input/output operations per second ("IOPs"), etc.) that may indicate a guaranteed rate at which a device, associated with the cloud computing service (e.g., computing resource 230), is to be available to process and/or store the traffic. Additionally, or alternatively, input/output field 520 may store an indication of a maximum rate at which input/output operations, associated with the customer traffic (e.g., a particular flow), are to be performed by a device associated with the cloud computing service (e.g., computing resource 230, such as a storage device). In some implementations, the guaranteed input/output operations rate and the maximum input/output operations rate may be identified by the same information stored in input/output field 520. For example, the information stored in input/output field 520 may indicate that computing resource 230 is to be available to process input/output operations at a particular rate (e.g., 400 IOPs), while the information may also indicate that input/output operations are not to be processed in excess of the same rate.

Bandwidth field 530 may store information that identifies a bandwidth rate that may be identified by enforcement policy information associated with the flow identified in flow identifier field 510. For example, bandwidth field 530 may store a bandwidth rate (e.g., 7 megabits per second ("Mbit/s"), etc.) that may indicate a guaranteed bandwidth rate at which a device, associated with the cloud computing service (e.g., computing resource 230), is to be available to process the traffic. Additionally, or alternatively, bandwidth field 530 may store a bandwidth rate (e.g., 7 Mbit/s, etc.) that indicates a maximum bandwidth rate at which a device associated with the cloud computing service (e.g., computing resource 230) is to process the customer traffic. In some implementations, the guaranteed bandwidth rate and the maximum bandwidth rate may be identified by the same information stored in bandwidth field 530. For example, the information stored in bandwidth field 530 may indicate that computing resource 230 is to be available to process the traffic, associated with the customer, at a particular bandwidth rate (e.g., 7 Mbit/s), while the information may also indicate that customer traffic is not to be processed in excess of the same bandwidth rate.

Enforcement policy information, associated with a flow, may be conceptually represented as a single row in data structure 500. For example, the first row of data structure 500 may correspond to enforcement policy information associated with a customer of the cloud computing service, and/or a traffic flow associated with the customer. As shown, the flow may be identified as EdgeCom (e.g., a flow associated with a customer named EdgeCom). As further shown, the enforcement policy information associated with EdgeCom may indicate that computing resource 230 is to be available to process input/output operations, associated with EdgeCom traffic, at a rate of up to 400 IOPs (e.g., a guaranteed performance metric). Additionally, or alternatively, the EdgeCom enforcement policy information may also indicate that input/output operations, associated with EdgeCom traffic, are not to be processed by computing resource 230 at a rate exceeding 400 IOPs (e.g., a maximum performance metric).

As further shown in the first row of data structure 500, the enforcement policy information associated with EdgeCom may indicate that computing resource 230 is to be available to process traffic, associated with EdgeCom, at a rate of up to 7 Mbit/s (e.g., a guaranteed performance metric). Additionally, the EdgeCom enforcement policy information may also indicate that traffic, associated with EdgeCom, is not to be processed by computing resource 230 at a rate exceeding 7 Mbit/s (e.g., a maximum performance metric).

Data structure 500 includes fields 510-530 for explanatory purposes. In practice, data structure 500 may include additional fields, fewer fields, different fields, or differently arranged fields than those shown in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or a component. Additionally, or alternatively, data structure 500 may include information provided from another source, such as information provided by a user and/or information automatically provided by a device.

Figure 6:
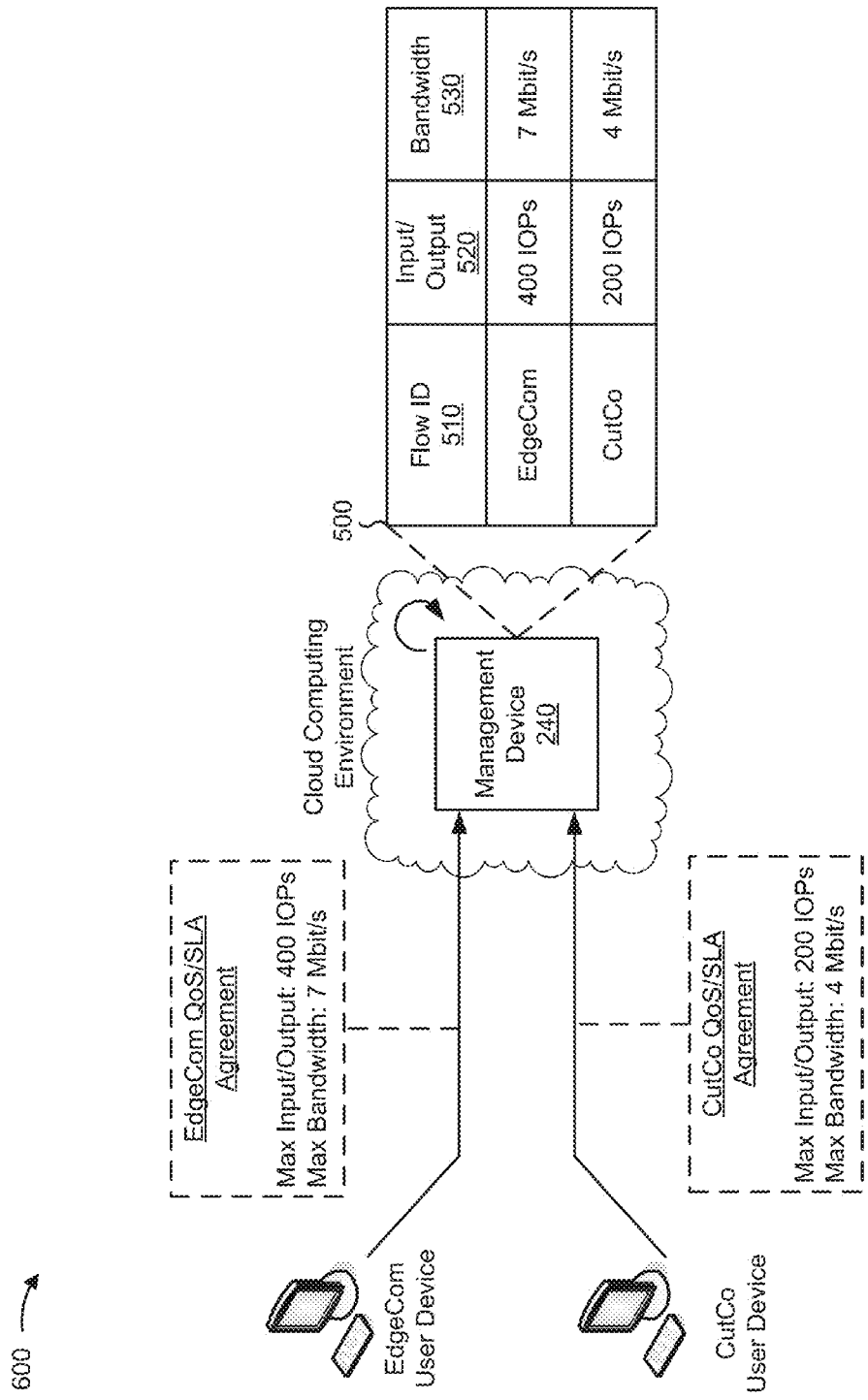
FIG. 6 is a diagram of an example implementation relating to the example process shown in FIG. 4.

FIG. 6 is a diagram of an example implementation 600 relating to example process 400 shown in FIG. 4. For the purpose of example implementation 600, assume that EdgeCom and CutCo are customers of a cloud computing service, and that EdgeCom and CutCo have each entered into a QoS/SLA agreement with the cloud computing service provider. Further, assume that a user device associated with EdgeCom is attempting to access the cloud computing service, and that a user device associated with CutCo is also attempting to access the cloud computing service. Finally, assume that computing resource 230 (not pictured) has been assigned to process the traffic associated with the EdgeCom user device, and has been assigned to process the traffic associated with the CutCo user device.

As shown in FIG. 6, QoS/SLA agreement information, associated with EdgeCom, may be stored by an EdgeCom user device, and may be sent to management device 240 when the EdgeCom user device attempts to access the cloud computing service. As shown, the EdgeCom agreement information may indicate that traffic, associated with EdgeCom, is to be processed by computing resource 230 at a rate of up to 400 IOPs and a bandwidth rate of up to 7 Mbit/s. As shown, QoS/SLA agreement information, associated with CutCo, may be stored by a CutCo user device, and may be sent to management device 240 when the CutCo user device attempts to access the cloud computing service. The CutCo agreement information may indicate that traffic, associated with CutCo, is to be processed at a rate of up to 200 IOPs and a bandwidth of up to 4 Mbit/s.

As further shown in FIG. 6, management device 240 may receive agreement information, associated with EdgeCom, from the EdgeCom user device, and may receive agreement information, associated with CutCo, from the CutCo user device. As shown, management device 240 may generate enforcement policy information associated with EdgeCom based on the agreement information received from the EdgeCom user device, and may generate enforcement policy information associated with CutCo based on the agreement information received from the CutCo user device. As shown, the enforcement policy information may indicate that EdgeCom traffic is to be processed at rates not exceeding those identified by the EdgeCom agreement information (e.g., 400 IOPs, 7 Mbit/s). Additionally, the enforcement policy information may indicate that CutCo traffic is to be processed at rates not exceeding those identified by the CutCo agreement information (e.g., 200 IOPs, 4 Mbit/s). As shown, the enforcement policy information may be stored by management device 240 in data structure 500.

As indicated above, FIG. 6 is provided merely as an example. Other examples are possible and may differ from what was described with regard to FIG. 6.

FIG. 7 is a flow chart of an example process 700 for identifying and managing traffic, associated with a customer of a cloud computing service, based on enforcement policy information. In some implementations, one or more process blocks of FIG. 7 may be performed by management device 240. In some implementations, one or more process blocks of FIG. 7 may be performed by another device or a group of devices separate from or including management device 240, such as computing resource 230 and/or user device 210.

As shown in FIG. 7, process 700 may include receiving traffic associated with a flow (block 710). For example, management device 240 may receive traffic, and may identify the traffic as being associated with a flow when the traffic is received (e.g., from user device 210). The flow may identify a particular customer of a cloud computing service provider, a particular quality of service level with which to treat traffic associated with the flow, and/or one or more computing resources 230 to handle the traffic associated with the flow (e.g., a volume that identifies a particular computing resource 230, such as a virtual machine).

In some implementations, management device 240 may identify the traffic as being associated with the flow based on receiving agreement information associated with a customer (e.g., based on QoS/SLA agreement information received by management device 240). Additionally, or alternatively, management device 240 may identify the traffic based on information associated with the contents of the traffic (e.g., a flow and/or customer identifier included within a packet header, etc.). Additionally, or alternatively, management device 240 may identify the traffic based on information associated with user device 210 from which the traffic originated (e.g., an internet protocol ("IP") address of user device 210 that is known to be associated with a customer, etc.). Additionally, or alternatively, management device 240 may identify the traffic based on information associated with a computing resource 230 to which the traffic is being sent.

As further shown in FIG. 7, process 700 may include determining a performance metric associated with the traffic (block 720). For example, management device 240 may determine a performance metric (e.g., an input/output operations rate, a bandwidth, etc.) associated with the traffic received from user device 210. In some implementations, management device 240 may determine the performance metric based on receiving the traffic from user device 210. Additionally, or alternatively, management device 240 may periodically (e.g., every 1 second, every 5 seconds, etc.) determine the performance metric during the time that traffic is being received, from user device 210, by management device 240 (e.g., while user device 210 is accessing the cloud computing service, etc.).

In some implementations, management device 240 may determine the performance metric based on information received from a device (e.g., computing resource 230) assigned to process the traffic. For example, user device 210 may send traffic to computing resource 230, and computing resource 230 may send information associated with the traffic to management device 240. In some implementations, management device 240 may determine the performance metric based on aggregating information received from one or more computing resources 230 and/or one or more components of one or more computing resources 230 (e.g., application 232, virtual machine 234, virtual storage 236, hypervisor 238).

In some implementations, management device 240 may determine one or more performance metrics (e.g., a rate of input/output operations, a bandwidth, etc.) associated with the traffic based on enforcement policy information associated with the customer (e.g., where one or more performance metrics are included in the enforcement policy information).

As further shown in FIG. 7, process 700 may include determining information indicating a maximum performance metric based on enforcement policy information associated with the flow (block 730). For example, management device 240 may determine information indicating a maximum performance metric (e.g., a maximum input/output operations rate, a maximum bandwidth, etc.) based on enforcement policy information, associated with the customer (e.g., identified by a flow identifier), stored by management device 240. In some implementations, the information indicating the maximum performance metric may be included in data structure 500 stored by management device 240 and/or another device (e.g., computing resource 230). Additionally, or alternatively, management device 240 may determine the information indicating the maximum performance metric based on information received from another device associated with the customer and/or cloud computing environment 220.

As further shown in FIG. 7, process 700 may include comparing the performance metric and the maximum performance metric (block 740). For example, management device 240 may compare the performance metric of the traffic, associated with the flow and/or the customer, to be processed by computing resource 230, and the maximum performance metric. In some implementations, management device 240 may compare the performance metric and the maximum performance metric based on determining the performance metric of the traffic. Additionally, or alternatively, management device 240 may periodically (e.g., every 1 second, every 5 seconds, etc.) compare the performance metric and the maximum performance metric (e.g., management device 240 may compare the performance metric to the maximum performance metric each time management device 240 determines the performance metric associated with the traffic).

As further shown in FIG. 7, process 700 may include managing the traffic based on comparing the performance metric and the maximum performance metric (block 750). For example, management device 240 may manage the traffic based on comparing the performance metric of the traffic, to be processed by computing resource 230, and the maximum performance metric, identified by enforcement policy information associated with the customer.

Managing traffic, as used herein, may include performing an operation associated with the traffic, such as receiving the traffic from user device 210 and/or computing resource 230, forwarding the traffic to computing resource 230 and/or user device 210, throttling the traffic (e.g., limiting a performance metric associated with the traffic), dropping the traffic, or the like. For example, management device 240 may determine that a performance metric (e.g., a bandwidth rate) for traffic, associated with a customer and destined for computing resource 230, is below a maximum performance rate (e.g., a maximum bandwidth rate) identified in enforcement policy information, associated with the customer, and management device 240 may forward the traffic to computing resource 230. As an additional example, management device 240 may determine that the performance rate for the traffic is above a maximum performance rate identified in enforcement policy information, and management device 240 may throttle and/or drop the traffic (e.g., such that the maximum performance rate is not exceeded) before forwarding the traffic to computing resource device 230.

In some implementations, management device 240 may manage traffic (e.g., associated with one or more customers) to be processed by computing resource 230, such that computing resource 230 may be capable (e.g., has sufficient resources, is not overburdened, etc.) of processing the traffic and/or storing information carried by the traffic at a guaranteed performance metric (e.g., a performance metric guaranteed to the one or more customers whose traffic is processed by computing resource 230). For example, management device 240 may determine that traffic, associated with a first customer, is sent at a performance metric exceeding a maximum performance metric included in enforcement policy information associated with the first customer. In such a case, management device 240 may manage the traffic (e.g., throttle the traffic) being processed by computing resource 230 to ensure that traffic associated with a second customer, and to be processed by the same computing resource 230, may be processed at a performance metric guaranteed to the second customer (e.g., by not allowing the first customer to overburden computing resource 230 with traffic).

In some implementations, multiple devices may be configured to manage the traffic, and may manage the traffic based on, for example, a flow identifier, a quality of service level associated with the traffic, or the like. For example, management device 240 and/or computing resource 230 (e.g., virtual machine 234, virtualized storage 236, hypervisor 238, a hypervisor virtual disk, a hypervisor disk driver, etc.) may manage the traffic. In this way, quality of service in a cloud computing environment may be guaranteed from end-to-end. While some implementations are described herein as being performed by management device 240, these implementations may additionally or alternatively be performed by one or more computing resources 230.

Although FIG. 7 shows example blocks of process 700, in some implementations, process 700 may include additional blocks, different blocks, fewer blocks, or differently arranged blocks than those depicted in FIG. 7. Additionally, or alternatively, one or more of the blocks of process 700 may be performed in parallel. Further, one or more blocks of process 700 may be omitted in some implementations.

Figure 8A:
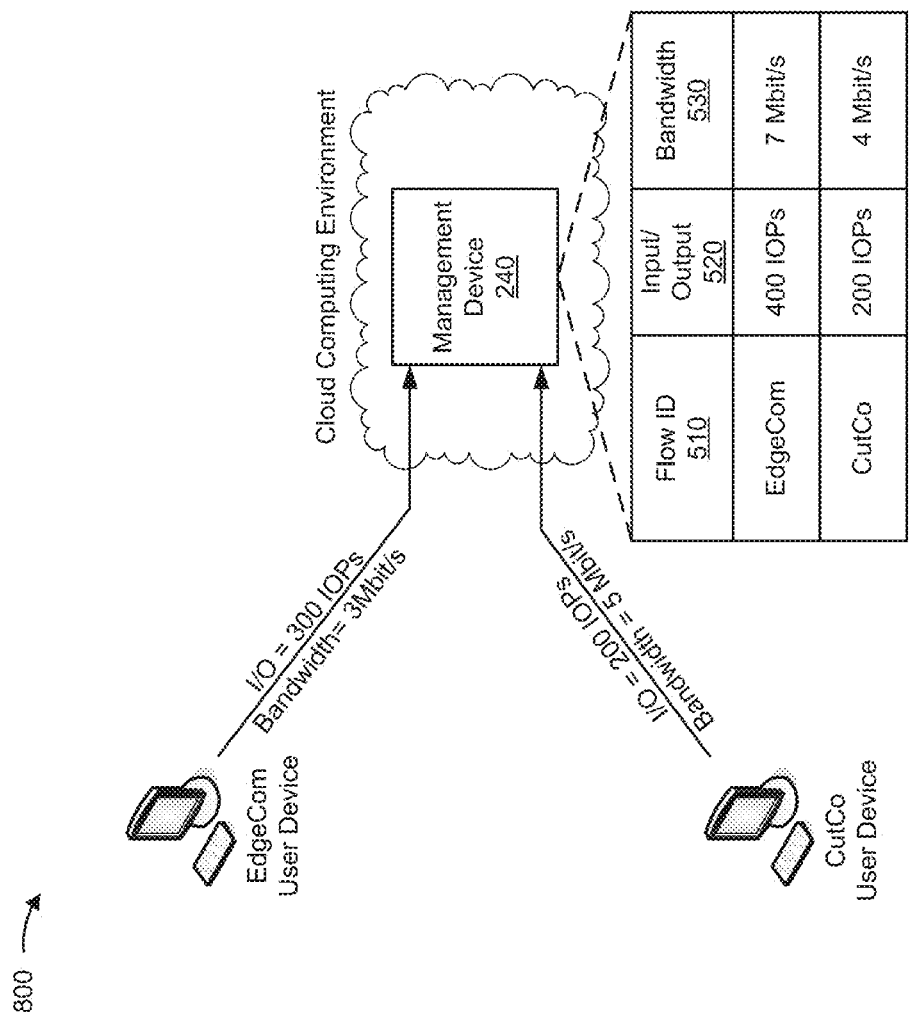
FIGS. 8A-8C are diagrams of an example implementation relating to the example process shown in FIG. 7.
Figure 8B:
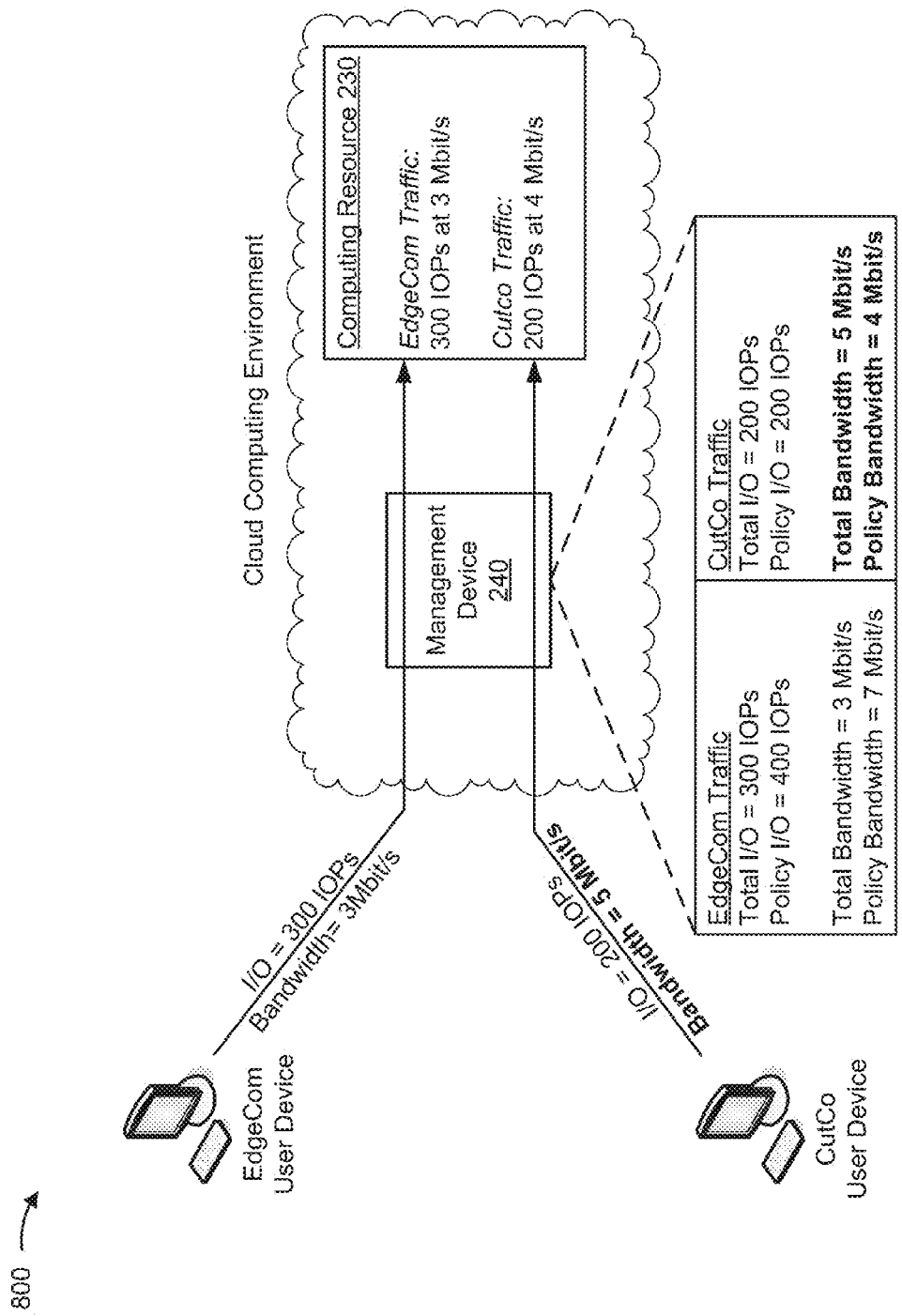
Figure 8C:
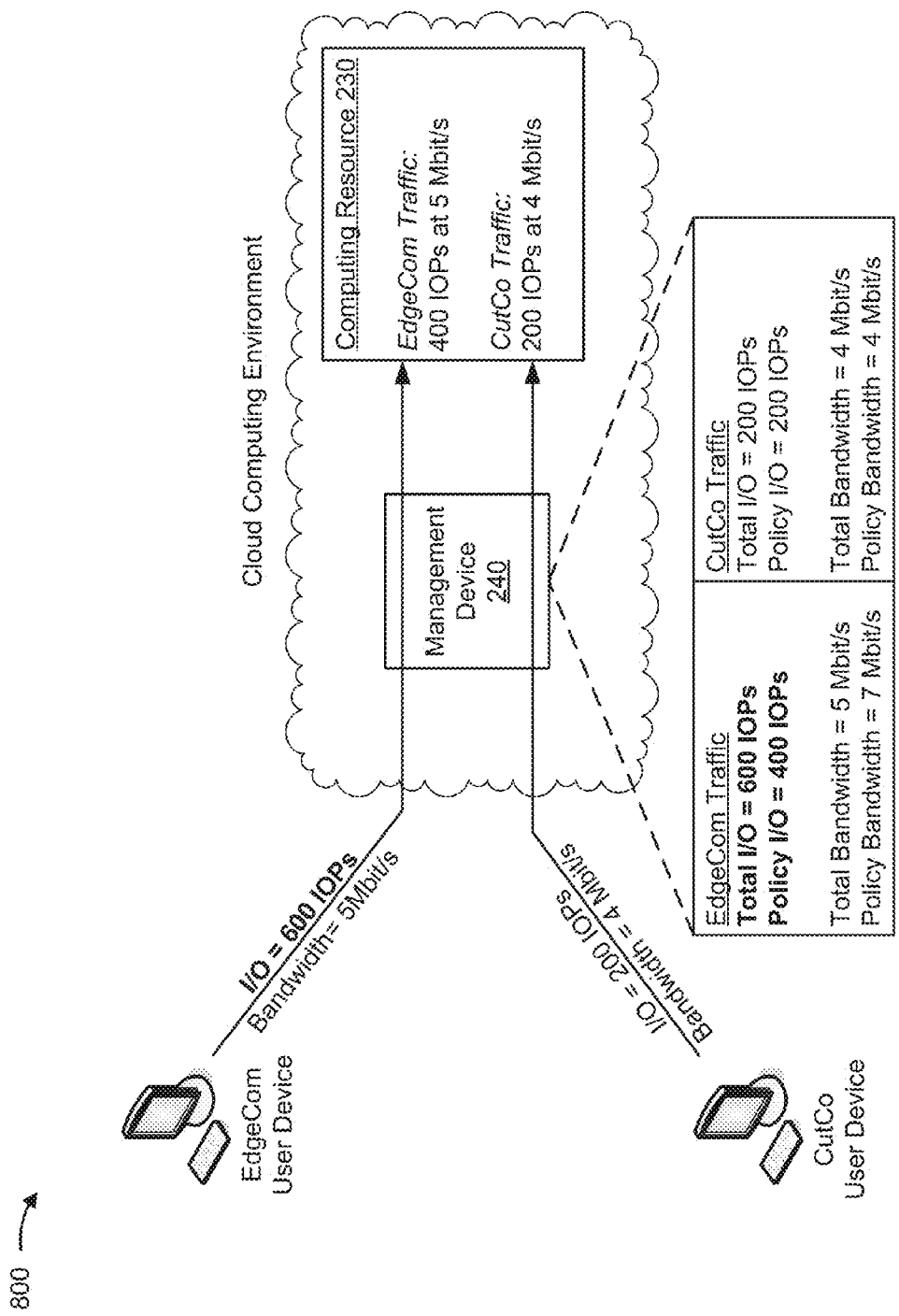

FIGS. 8A-8C are diagrams of an example implementation 800 relating to example process 700 shown in FIG. 7. For the purpose of example implementation 800, assume that a customer of a cloud computing service, EdgeCom, has entered into a QoS/SLA agreement with the cloud computing service provider. Further, assume that enforcement policy information, associated with the EdgeCom agreement, has been generated and is stored by management device 240. Also, assume that another customer of a cloud computing service, CutCo, has entered into a QoS/SLA agreement with the cloud computing service provider. Further, assume that enforcement policy information, associated with the CutCo agreement, has been generated and is stored by management device 240. Finally, assume that computing resource 230 has been assigned to process the traffic associated with the EdgeCom user device, and has been assigned to process the traffic associated with the CutCo user device.

As shown in FIG. 8A, a user device associated with EdgeCom may access the cloud computing service, and may send traffic to management device 240. As shown, management device 240 may identify the traffic as being associated with EdgeCom based on information associated with the user device (e.g., a flow identifier, a known IP address associated with the EdgeCom user device, etc.). As further shown, a user device associated with CutCo may access the cloud computing service, and may send traffic to management device 240. As shown, management device 240 may identify the traffic as being associated with CutCo based on information associated with the user device (e.g., a flow identifier, a known IP address associated with the CutCo user device, etc.).

As further shown in FIG. 8A, management device 240 may determine a performance metric associated with the traffic received from the EdgeCom user device, and may determine a performance metric associated with the traffic received from the CutCo user device. As shown, management device 240 may determine that the EdgeCom traffic is being sent at a rate that requires 300 IOPs (e.g., per a time period) and is being sent at a bandwidth rate of 3 Mbit/s. Similarly, management device 240 may determine that the CutCo traffic is being sent at a rate that requires 200 IOPs (e.g., per a time period) and is being sent at a bandwidth rate of 5 Mbit/s.

As further shown in FIG. 8A, management device 240 may determine information indicating a maximum performance metric for the traffic associated with each customer based on enforcement policy information, associated with each customer, stored by management device 240. As shown, management device 240 may determine that traffic associated with EdgeCom is not to be processed at a rate that requires more than 400 IOPs (e.g., per a time period), and is not to be processed at a bandwidth rate exceeding 7 Mbit/s. As also shown, management device 240 may determine that traffic associated with CutCo is not to be processed at a rate that requires more than 200 IOPs (e.g., per a time period), and is not to be processed at a bandwidth rate exceeding 4 Mbit/s.

As shown in FIG. 8B, management device 240 may compare the performance metric, associated with the traffic of each customer, to the maximum performance metric, associated with each customer, included in the enforcement policy information. As shown, management device 240 may compare the input/output operations rate of the EdgeCom traffic (e.g., 300 IOPs) to the maximum input/output operations rate identified in the enforcement policy information (e.g., 400 IOPs) associated with EdgeCom, and may determine that the input/output operations rate associated with the EdgeCom traffic is below the maximum allowable rate. As also shown, management device 240 may compare the bandwidth rate of the EdgeCom traffic (e.g., 3 Mbit/s) to the maximum bandwidth rate identified in the enforcement policy information (e.g., 7 Mbit/s), and may determine that the bandwidth rate associated with the EdgeCom traffic is below the maximum allowable rate.

As further shown in FIG. 8B, management device 240 may compare the input/output operations rate of the CutCo traffic (e.g., 200 IOPs) to the maximum input/output operations rate identified in the enforcement policy information (e.g., 200 IOPs) associated with CutCo, and may determine that the input/output operations rate associated with the CutCo traffic is equal to the maximum allowable rate. As also shown, management device 240 may compare the bandwidth rate of the CutCo traffic (e.g., 5 Mbit/s) to the maximum bandwidth rate identified in the enforcement policy information (e.g., 4 Mbit/s), and may determine that the bandwidth rate associated with the CutCo traffic is above the maximum allowable rate.

As further shown in FIG. 8B, management device 240 may manage the traffic, associated with each customer, based on comparing the performance metric and the maximum performance metric. As shown, management device 240 may manage the EdgeCom traffic by forwarding the traffic (e.g., at a rate that requires 300 IOPs and a rate of 3 Mbit/s) for processing by computing resource 230.

As further shown in FIG. 8B, management device 240 may manage the CutCo traffic by throttling the bandwidth rate of the traffic such that the bandwidth rate does not exceed the maximum bandwidth rate identified in the enforcement policy information associated with CutCo. As shown, management device 240 may forward the throttled traffic (e.g., at a rate that requires 200 IOPs and a rate of 4 Mbit/s) for processing by computing resource 230.

As an additional example, as shown in FIG. 8C, management device 240 may again determine a performance metric associated with the traffic received from the EdgeCom user device and may determine a performance metric associated with the traffic received from the CutCo user device (e.g., one second after the first determination of the performance metric associated with each customer). As shown, the performance metric associated with the EdgeCom traffic may have an increased input/output operations rate (e.g., to 600 IOPs) and may have an increased bandwidth rate (e.g., 5 Mbit/s). As also shown, the performance metric associated with the CutCo traffic may have a reduced bandwidth rate (e.g., 4 Mbit/s) and may have maintained the same input/output operations rate (e.g., 200 IOPs) as previously determined.

As discussed above, management device 240 may compare the performance metric of the traffic associated with each customer to the maximum performance metric identified in the enforcement policy information associated with each customer.

As shown, management device 240 may determine that the input/output operations rate and the bandwidth rate, associated with the CutCo traffic, are equal to the maximum allowable rate (e.g., 200 IOPs, 4 Mbit/s). As further shown, management device 240 may determine that the bandwidth rate associated with the EdgeCom traffic (e.g., 5 Mbit/s) remains below the maximum allowable rate (e.g., 7 Mbit/s), and may determine that the input/output operations rate associated with the EdgeCom traffic (e.g., 600 IOPs) now exceeds the maximum allowable rate identified in the enforcement policy information (e.g., 400 IOPs).

As discussed above, management device 240 may manage the traffic associated with each customer (e.g., by forwarding the CutCo traffic, by throttling the EdgeCom traffic, etc.). In this way, management device 240 may manage traffic associated with EdgeCom, and may manage traffic associated with Cutco, in such a way as to prevent either customer from overburdening computing resource 230, thereby guaranteeing that traffic, associated with each customer, may be processed in accordance with the QoS/SLA agreement associated with each customer.

As indicated above, FIGS. 8A-8C are provided merely as an example. Other examples are possible and may differ from what was described with regard to FIGS. 8A-8C.

Figure 9A:
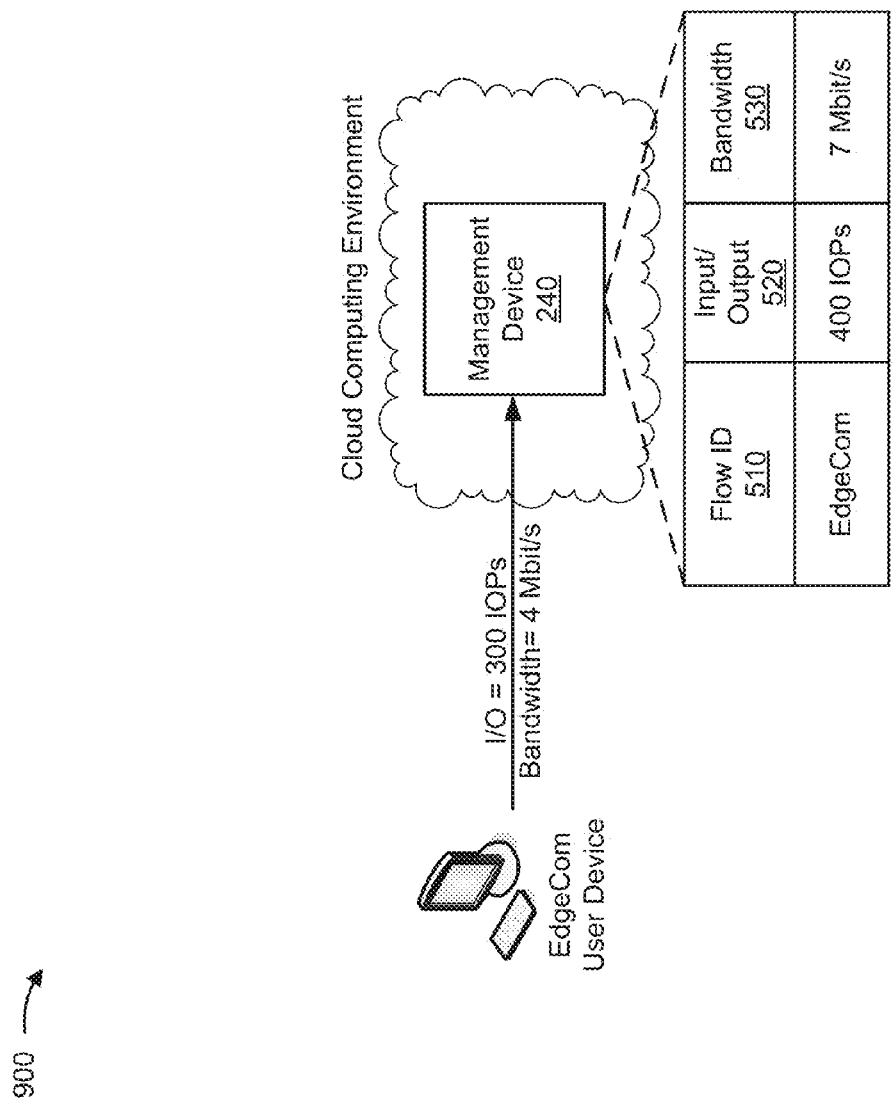
FIGS. 9A-9C are diagrams of an additional example implementation relating to the example process shown in FIG. 7.
Figure 9B:
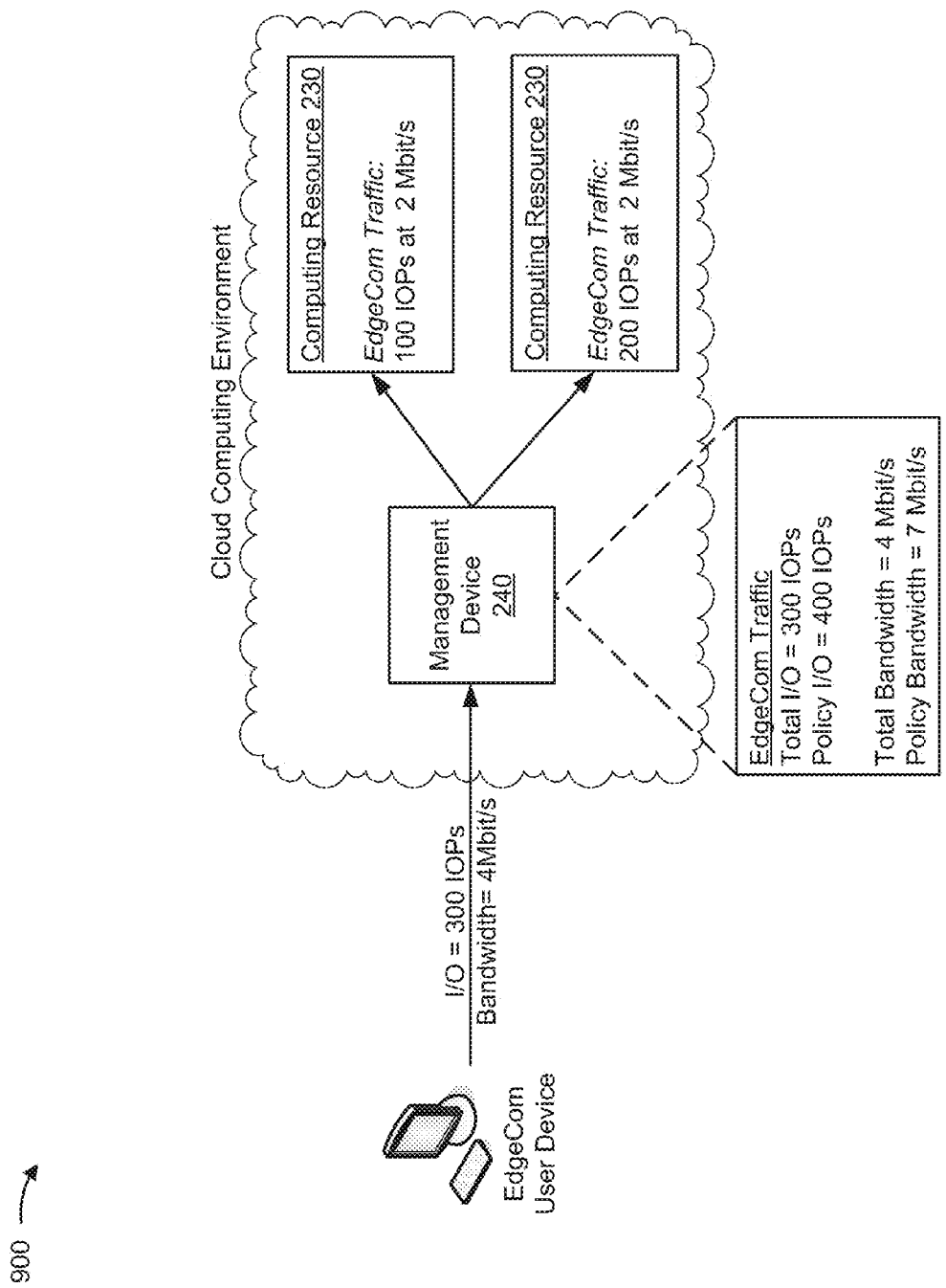
Figure 9C:
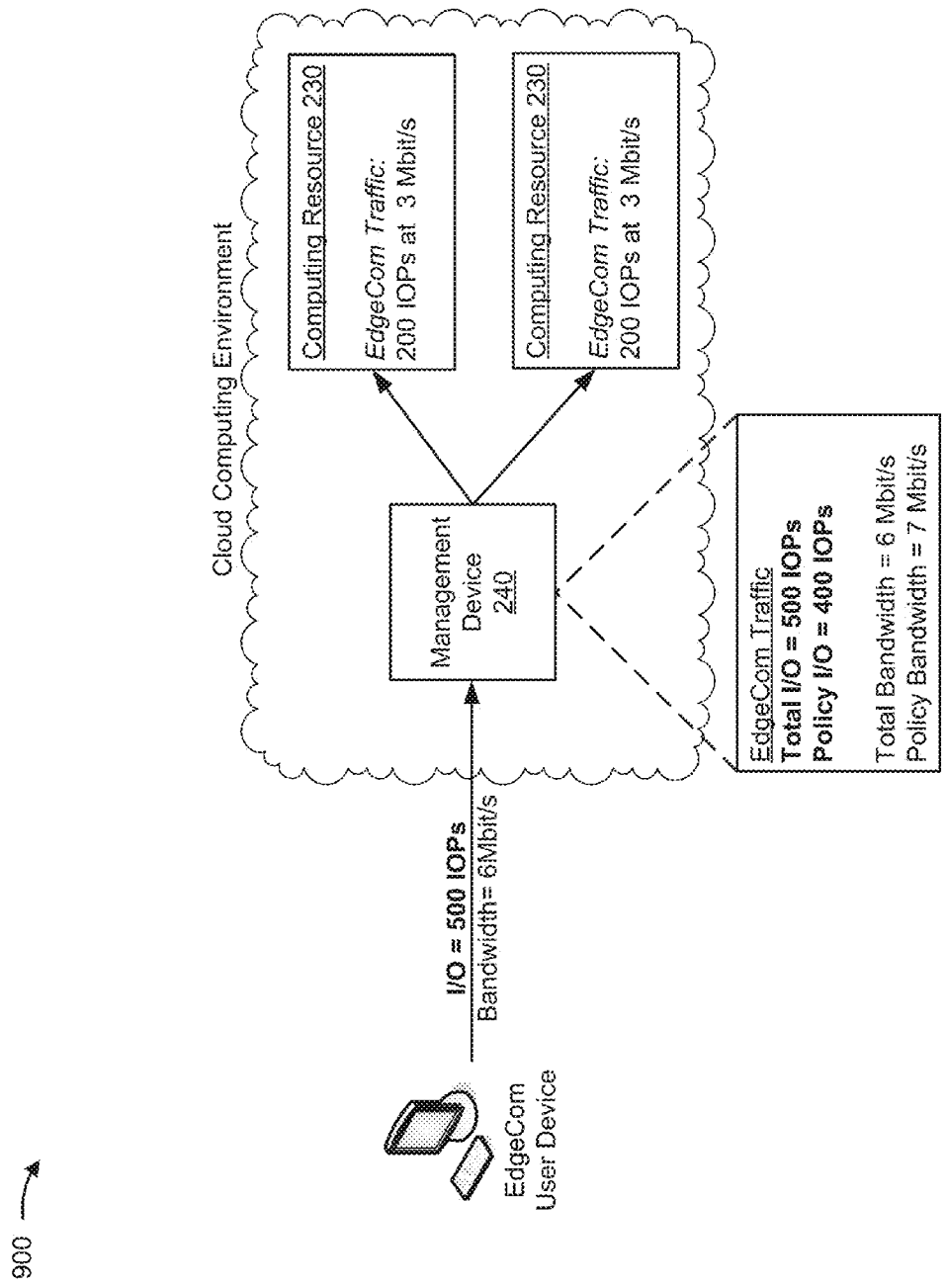

FIGS. 9A-9C are diagrams of an additional example implementation 900 relating to example process 700 shown in FIG. 7. For the purpose of example implementation 900, assume that a customer of a cloud computing service, EdgeCom, has entered into a QoS/SLA agreement with the cloud computing service provider. Further, assume that enforcement policy information, associated with the EdgeCom agreement, has been generated and is stored by management device 240. Finally, assume that two computing resources 230 have been assigned to process the traffic associated with the EdgeCom user device.

As shown in FIG. 9A, a user device associated with EdgeCom may access the cloud computing service, and may send traffic to management device 240. As shown, management device 240 may identify the traffic as being associated with EdgeCom based on information associated with the user device (e.g., a known IP address associated with the EdgeCom user device).

As further shown in FIG. 9A, management device 240 may determine a performance metric associated with the traffic received from the EdgeCom user device. As shown, management device 240 may determine that the EdgeCom traffic is being sent at a rate of 300 IOPs and is being sent at a bandwidth rate of 4 Mbit/s.

As further shown in FIG. 9A, management device 240 may determine information indicating a maximum performance metric for the traffic associated with EdgeCom based on enforcement policy information, associated with EdgeCom, stored by management device 240. As shown, management device 240 may determine that traffic associated with EdgeCom is not to be processed at a rate exceeding 400 IOPs, and is not to be processed at a bandwidth rate exceeding 7 Mbit/s.

As shown in FIG. 9B, management device 240 may compare the performance metric, associated with the EdgeCom traffic, to the maximum performance metric included in the EdgeCom enforcement policy information. As shown, management device 240 may compare the input/output operations rate of the EdgeCom traffic (e.g., 300 IOPs) to the maximum input/output operations rate identified in the enforcement policy information (e.g., 400 IOPs) associated with EdgeCom, and may determine that the input/output operations rate associated with the EdgeCom traffic is below the maximum allowable rate. As also shown, management device 240 may compare the bandwidth rate of the EdgeCom traffic (e.g., 4 Mbit/s) to the maximum bandwidth rate identified in the enforcement policy information (e.g., 7 Mbit/s), and may determine that the bandwidth rate associated with the EdgeCom traffic is below the maximum allowable rate.

As further shown in FIG. 9B, management device 240 may manage the traffic, associated with EdgeCom, based on comparing the performance metric and the maximum performance metric. As shown, management device 240 may manage the EdgeCom traffic by forwarding the traffic (e.g., at 100 IOPs and a rate of 2 Mbit/s to a first computing resource 230, and at 200 IOPs and a rate of 2 Mbit/s to a second computing resource 230) for processing by two computing resources 230.

As an additional example, as shown in FIG. 9C, management device 240 may again determine a performance metric associated with the traffic received from the EdgeCom user device (e.g., one second after the first determination of the performance metric). As shown, the performance metric associated with the EdgeCom traffic may have an increased input/output operations rate (e.g., to 500 IOPs) and may have an increased bandwidth rate (e.g., 6 Mbit/s).

As discussed above, management device 240 may compare the performance metric of the traffic associated with EdgeCom to the maximum performance metric identified in the enforcement policy information associated with EdgeCom.

As shown, management device 240 may determine that the bandwidth rate associated with the EdgeCom traffic (e.g., 6 Mbit/s) remains below the maximum allowable rate (e.g., 7 Mbit/s), and may determine that the input/output operations rate associated with the EdgeCom traffic (e.g., 500 IOPs) now exceeds the maximum allowable rate identified in the enforcement policy information (e.g., 400 IOPs).

As discussed above, management device 240 may manage the EdgeCom traffic (e.g., by throttling the EdgeCom traffic, etc.). As shown in FIG. 9C, each computing resource 230 may process EdgeCom traffic at an input/output operations rate of 200 IOPs and at a bandwidth rate of 3 Mbit/s. As shown in FIG. 9C, an aggregated input/output operations rate for EdgeCom traffic may be determined by adding the input/output operations rate associated with each computing resource (e.g., 200 IOPs+200 IOPs=400 IOPs), and an aggregated bandwidth rate may be determined by adding the bandwidth rate associated with each computing resource 230 (e.g., 3 Mbit/s+3 Mbit/s=6 Mbit/s).

As shown, the aggregated performance metric (e.g., associated with two different computing resources 230) may be used to determine whether traffic, associated with a customer, is to be managed (e.g., throttled, etc.) by management device 240. In this way, management device 240 may manage traffic associated with EdgeCom in such a way as to prevent EdgeCom traffic from overburdening either computing resource 230, thereby guaranteeing that traffic, associated with another customer, may be processed by either computing resource 230 in accordance with a QoS/SLA agreement associated with the other customer.

As indicated above, FIGS. 9A-9C are provided merely as an example. Other examples are possible and may differ from what was described with regard to FIGS. 9A-9C.

Implementations described herein may allow a cloud computing service provider to enforce an agreement (e.g., a QoS/SLA agreement), associated with a customer, and may guarantee, to another customer, that sufficient computing resources will be available to process traffic in accordance with an agreement associated with the other customer. In this way, a computing resource may not be overburdened, and a performance metric, associated with processing the traffic, may be guaranteed from end-to-end.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations shown in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

As used herein, the term component is intended to be broadly construed as hardware, firmware, or a combination of hardware and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive traffic to be processed by one or more cloud computing resources associated with a cloud computing service provided via a cloud computing environment;
      determine enforcement policy information associated with the traffic,
         the enforcement policy information including information that identifies:
            a first customer associated with the traffic and the cloud computing service, and
            the one or more cloud computing resources assigned to the first customer for processing the traffic;
      determine a first aggregated performance metric associated with the traffic,
         the first aggregated performance metric being based on first input/output operations rates and first bandwidth rates associated with the one or more cloud computing resources assigned to the first customer for processing the traffic,
            the first input/output operations rates indicating guaranteed rates at which the one or more cloud computing resources, assigned to the first customer, process and store the traffic;
      determine a second aggregated performance metric based on performance metrics associated with one or more second customers,
         the one or more cloud computing resources being assigned to the one or more second customers,
         the second aggregated performance metric being based on second input/output operations rates and second bandwidth rates associated with the one or more second customers;
      determine a maximum performance metric associated with the traffic,
         the maximum performance metric being identified in the enforcement policy information,
         the maximum performance metric identifying a rate of input/output operations and a bandwidth rate associated with the one or more cloud computing resources;
      compare the first aggregated performance metric and the second aggregated performance metric with the maximum performance metric; and
      manage the traffic based on comparing the first aggregated performance metric and the second aggregated performance metric with the maximum performance metric,
         the traffic being managed to ensure that the performance metrics, associated with the one or more second customers, are satisfied,
         the one or more processors, when managing the traffic, are to:
            determine that the first aggregated performance metric is greater than the maximum performance metric,
            throttle the traffic based on determining that the first aggregated performance metric is greater than the maximum performance metric, and
            forward the throttled traffic to the one or more cloud computing resources assigned to process the traffic,
               the throttled traffic being a portion of the traffic.

2. The device of claim 1, where the one or more processors are further to:
   receive the traffic from a user device associated with the first customer; and
   determine the enforcement policy information based on receiving the traffic from the user device associated with the first customer.

3. The device of claim 1, where the one or more processors are further to:
   determine the first aggregated performance metric at one or more intervals of time while the traffic is being received;

compare, at the one or more intervals of time, the first aggregated performance metric and the second aggregated performance metric with the maximum performance metric; and manage the traffic, at the one or more intervals of time, based on comparing the first aggregated performance metric and the second aggregated performance metric with the maximum performance metric.

4. The device of claim 1, where the one or more processors are further to:

determine that the second aggregated performance metric is greater than the maximum performance metric; and prevent at least another portion of the traffic from being forwarded to at least one of the one or more cloud computing resources, based on determining that the second aggregated performance metric is greater than the maximum performance metric.

5. The device of claim 1, where the one or more processors are further to:

determine that the second aggregated performance metric is less than or equal to the maximum performance metric; and forward the traffic to the one or more cloud computing resources assigned to process the traffic, based on determining that the second aggregated performance metric is less than or equal to the maximum performance metric.

6. The device of claim 1, where the enforcement policy information includes a flow identifier that identifies a flow associated with a particular customer, a particular quality of service level, or a particular computing resource.

7. The device of claim 1, where the first bandwidth rates indicate guaranteed bandwidth rates at which the one or more cloud computing resources, assigned to the first customer, are to be available to process the traffic.

8. A non-transitory computer-readable medium storing instructions, the instructions comprising:

one or more instructions that, when executed by one or more processors of a device, cause the one or more processors to:

receive traffic to be processed by one or more cloud computing resources associated with a cloud computing service provided via a cloud computing environment;

determine enforcement policy information associated with the traffic, the enforcement policy information including information that identifies:

a first customer associated with the traffic and the cloud computing service, and the one or more cloud computing resources assigned to the first customer for processing the traffic;

determine a first aggregated performance metric associated with the traffic, the first aggregated performance metric being based on first input/output operations rates and first bandwidth rates associated with the one or more cloud computing resources assigned to the first customer for processing the traffic, the first input/output operations rates indicating guaranteed rates at which the one or more cloud computing resources, assigned to the first customer, process and store the traffic;

determine a second aggregated performance metric based on performance metrics associated with one or more second customers, the one or more cloud computing resources being assigned to the one or more second customers, the second aggregated performance metric being based on second input/output operations rates and second bandwidth rates associated with the one or more second customers;

determine a maximum performance metric associated with the traffic, the maximum performance metric being identified in the enforcement policy information, the maximum performance metric identifying a rate of input/output operations and a bandwidth rate associated with the one or more cloud computing resources;

compare the first aggregated performance metric and the second aggregated performance metric with the maximum performance metric; and manage the traffic based on comparing the first aggregated performance metric and the second aggregated performance metric with the maximum performance metric, the traffic being managed to ensure that the performance metrics, associated with the one or more second customers, are satisfied, the one or more instructions that cause the one or more processors to manage the traffic, cause the one or more processors to:

determine that the first aggregated performance metric is greater than the maximum performance metric, throttle the traffic based on determining that the first aggregated performance metric is greater than the maximum performance metric, and forward the throttled traffic to the one or more cloud computing resources assigned to process the traffic, the throttled traffic being a portion of the traffic.

9. The non-transitory computer-readable medium of claim 8, where the instructions further comprise:

one or more instructions that cause the one or more processors to:

receive the traffic from a user device associated with the first customer; and determine the enforcement policy information based on receiving the traffic from the user device associated with the first customer.

10. The non-transitory computer-readable medium of claim 8, where the instructions further comprise:

one or more instructions that cause the one or more processors to:

determine the first aggregated performance metric at one or more intervals of time while the traffic is being received;

compare, at the one or more intervals of time, the first aggregated performance metric and the second aggregated performance metric with the maximum performance metric; and manage the traffic, at the one or more intervals of time, based on comparing the first aggregated performance metric and the second aggregated performance metric with the maximum performance metric.

11. The non-transitory computer-readable medium of claim 8, where the instructions further comprise:

one or more instructions that cause the one or more processors to:

determine that the second aggregated performance metric is greater than the maximum performance metric; and prevent at least another portion of the traffic from being forwarded to at least one of the one or more cloud computing resources, based on determining that the second aggregated performance metric is greater than the maximum performance metric.

12. The non-transitory computer-readable medium of claim 8, where the instructions further comprise:
one or more instructions that cause the one or more processors to:
determine that the second aggregated performance metric is less than or equal to the maximum performance metric; and
forward the traffic to the one or more cloud computing resources assigned to process the traffic, based on determining that the second aggregated performance metric is less than or equal to the maximum performance metric.

13. The non-transitory computer-readable medium of claim 8, where the enforcement policy information includes a flow identifier that identifies a flow associated with a particular customer, a particular quality of service level, or a particular computing resource.

14. The non-transitory computer-readable medium of claim 8, where the first bandwidth rates indicate guaranteed bandwidth rates at which the one or more cloud computing resources, assigned to the first customer, are to be available to process the traffic.

15. A method, comprising:
receiving, by a device, traffic to be processed by one or more cloud computing resources associated with a cloud computing service provided via a cloud computing environment;
determining, by the device, enforcement policy information associated with the traffic,
the enforcement policy information including information that identifies:
a first customer associated with the traffic and the cloud computing service, and
the one or more cloud computing resources assigned to the first customer for processing the traffic;
determining, by the device, a first aggregated performance metric associated with the traffic,
the first aggregated performance metric being based on first input/output operations rates and first bandwidth rates associated with the one or more cloud computing resources assigned to the first customer for processing the traffic,
the first input/output operations rates indicating guaranteed rates at which the one or more cloud computing resources, assigned to the first customer, process and store the traffic;
determining, by the device, a second aggregated performance metric based on performance metrics associated with one or more second customers,
the one or more cloud computing resources being assigned to the one or more second customers,
the second aggregated performance metric being based on second input/output operations rates and second bandwidth rates associated with the one or more second customers;
determining, by the device, a maximum performance metric associated with the traffic,
the maximum performance metric being identified in the enforcement policy information,
the maximum performance metric identifying a rate of input/output operations and a bandwidth rate associated with the one or more cloud computing resources;
comparing, by the device, the first aggregated performance metric and the second aggregated performance metric with the maximum performance metric; and
managing, by the device, the traffic based on comparing the first aggregated performance metric and the second aggregated performance metric with the maximum performance metric,
the traffic being managed to ensure that the performance metrics, associated with the one or more second customers, are satisfied,
managing the traffic including:
determining that the first aggregated performance metric is greater than the maximum performance metric,
throttling the traffic based on determining that the first aggregated performance metric is greater than the maximum performance metric, and
forwarding the throttled traffic to the one or more cloud computing resources assigned to process the traffic,
the throttled traffic being a portion of the traffic.

16. The method of claim 15, further comprising:
receiving the traffic from a user device associated with the first customer; and
determining the enforcement policy information based on receiving the traffic from the user device associated with the first customer.

17. The method of claim 15, further comprising:
determining the first aggregated performance metric at one or more intervals of time while the traffic is being received;
comparing, at the one or more intervals of time, the first aggregated performance metric and the second aggregated performance metric with the maximum performance metric; and
managing the traffic, at the one or more intervals of time, based on comparing the first aggregated performance metric and the second aggregated performance metric with the maximum performance metric.

18. The method of claim 15, further comprising:
determining that the second aggregated performance metric is greater than the maximum performance metric; and
preventing at least another portion of the traffic from being forwarded to at least one of the one or more cloud computing resources, based on determining that the second aggregated performance metric is greater than the maximum performance metric.

19. The method of claim 15, where the enforcement policy information includes a flow identifier that identifies a flow associated with a particular customer, a particular quality of service level, or a particular computing resource.

20. The method of claim 15, where the first bandwidth rates indicate guaranteed bandwidth rates at which the one or more cloud computing resources, assigned to the first customer, are to be available to process the traffic.

* * * * *